INVENTORS
Edouard Lecluyse &
Antoine Beranger

United States Patent Office
3,611,484
Patented Oct. 12, 1971

3,611,484
APPARATUS FOR MANUFACTURE OF HOLLOW OBJECTS
Edouard Lecluyse, Dampierre-en-Crot, Aubigny, and Antoine Beranger, Charenton, France, assignors to Tuboplast-France, S.A., Paris, France
Filed June 25, 1969, Ser. No. 836,442
Claims priority, application France, June 28, 1968, 157,110
Int. Cl. B29d 27/04
U.S. Cl. 18—5 BB
11 Claims

ABSTRACT OF THE DISCLOSURE

Machine for the continuous blowing of heated tubular preforms of thermoplastic material. A turret rotating continuously about a vertical axis, carries a plurality of molds and blowing heads, one for each mold. Each mold consists of a half fixed with the turret, and a second half pivotable from a first open position to a second position closed upon its fixed half. A chain has tubular link pivots each adapted to hold in depending relation therefrom, a respective heated preform. Rotation of the turret is synchronized with travel of the chain so that each preform moves with the chain into a respective open, fixed mold half. Cams fixed about the axis of rotation of the turret cooperate with cam follower means to (a) close each movable mold half onto its fixed half to enclose the preform, (b) lock the two mold halves together, (c) move the corresponding blowing head into pressure-tight relation with the tubular chain-link pivot, (d) operate a valve to connect the interior of the preform, through the tubular chain-link pivot, to a source of compressed air to expand the preform to the shape of the mold, (e) operate the valve to shut off compressed air and to connect the preform to exhaust, (f) cool the shaped article, (g) release the mold lock, (h) open the mold, and (i) remove the shaped article from its chain-link pivot. The operation is rapid, continuous, regular, uniform and without dwell.

This invention relates to an improvement in apparatus for the continuous blowing of hollow or tubular preforms or articles, of glass or synthetic plastics, as basically shown in U.S. Pat. No. 3,415,915, granted to the present applicants.

In the aforesaid patent there is disclosed a machine which rapidly and with uniform regularity and continuity, fabricates material or preforms such as lengths of tubes heated to plasticity, by blowng or expandng them in succession each within a respective one of a plurality of continuously rotating molds.

In general, the machine comprises an endless chain moving continuously in a fixed guided predetermined horizontal path, and which conveys the tubular preforms through a series of successive steps or operations, from a station where the preforms are mounted in succession each on a respective tubular chain-link pivot, to a second station where the preforms are heated to softening temperature, thence to the machine wherein the heated preforms are blown into desired form, cooled, and finally to a station where each completed article is removed from the chain for collection.

The patented machine embodies a feed station where the preforms are directed in rapid succession to feeding means by which they are sequentially positioned in certain location on the tubular pivots of successive links of the chain, a furnace through which the loaded chain passes in a serpentine path and by which the preforms are heated to softening or molding temperature. After heating, the chain with its preforms passes immediately to a machine by which each heated preform is, in succession, blown into the desired form while held between separable mold halves. Then each shaped article is cooled to handling temperature and subsequently and sequentially moved by and with the chain, to a station where it is removed from the chain and collected. The chain assures positive and accurate feeding of the preforms at all time to and into the blowing machine, and the transport from such machine to the unloading station, of the blown or completed and cooled articles.

The feeding means of the patent operates continuously and is of particular interest in its construction whereby the preforms are initially in horizontal stacked position in a feed bin and are picked up one by one and transported in horizontal position, in a continuous manner, to a loading station at which they are rotated from horizontal to vertical position, fed in succession, one by one, onto successive links of the chain. The movement of the preforms from the time they leave the feed bin until they are loaded onto the link pivots of the chain, is effected in accurately-timed relation with movement of the chain. Linear travel of the chain is uniform and continuous, without dwell.

The station at which the preforms are continuously loaded onto link pivots of the chain, is characterized by means for gripping the preforms while in the vertical position, means for elevating them and positioning each into contact with respective and successive ones of the tubular chain-link pivots. The movement of this elevating and loading means is synchronized with and operated by the chain and a fixed cam.

The heating furnace taught by the patent is also of particular interest in its construction wherein the chain carrying preforms loaded thereon, are directed in a sinuous or serpentine path through sequential zones where increasingly high temperatures are maintained by the circulation of heated air in and through the respective zones so that each preform as it emerges from the furnace is uniformly heated to molding temperature.

At the blowing station the turret is rotated by or with the chain, and carries a number of molds. Each mold consists of two halves wherein one half can be pivoted about a horizontal axis from a first closed position wherein it forms with its respective other half, a complete mold, 90° to a second open loading and unloading position. As subsequently described in detail these mold halves are jacketed for the circulation of coolant such as water.

The blowing machine further includes means for effecting at the proper instant, vertical translation of a corresponding one of a number of blowing heads or nozzles in succession, into pressure-tight contact with each tubular chain-link pivot or chuck as it moves with its preform enclosed within the presently-closed mold. Then pressure fluid is released into the preform, through the tubular pivot, to expand the preform into the shape of the mold cavity. Next, in continued rotation of the turret, each pivotable mold half is pivoted in succession to its open position to expose the shaped article for removal from the mold by and in response to continued movement of the chain. All movements are controlled by and synchronized with rotation of the turret which, as previously noted, is rotated in synchronization with the constant rate of linear travel of the chain.

At the station where the shaped articles are continuously and sequentially removed from the chain it is of particular interest to note that the completed blown articles pass with the chain about a sprocket and are thereafter stripped each from its chain-link pivot by mechanism operated by a fixed cam track.

The present invention relates to an improvement in the blowing mechanism of the aforesaid apparatus.

It is an object of the present invention to provide mechanism wherein the opening and closing of the mold halves as aforesaid, is effected by a first cam fixed coaxially of the axis of rotation of the turret in cooperation with a number of cam followers one for each mold. These followers in their rotation with the turret and in response to actuation by the cam, operate levers each of which pivots its corresponding mold half between open and closed positions.

It is a further object to provide apparatus wherein a second cam fixed coaxially of and about the axis of rotation of the turret, vertically translates in succession each of a plurality of blowing heads, one for each mold, first into blowing relation with one of the tubular link pivots of the chain, for blowing of a heated preform within the closed mold and then, after blowing of the preform, into retracted position readying the mold for opening.

Yet another object is to provide cam mechanism operated in synchronism with rotation of the turret, for positively locking each pivotable mold half in closed relation with respect to its fixed mold half, just before blowing is effected. Such mechanism also operates to unlock the pivoted mold halves, in succession, just before the aforesaid first cam pivots the pivotable mold half to open position.

Another object is to provide an improved form of blowing head having a downwardly-facing frusto-conical aperture coaxially of its axis of vertical translation, and which cooperates with specially-shaped upper ends of the tubular chain-link pivots to effect automatic centering and a pressure-tight seal when each head is translated to blowing position.

Still another object is to provide an improved structure wherein the thrust of each blowing head as it is forced downwardly into pressure-tight relation with a corresponding tubular chain-link pivot, is taken by a special, sprocket-type plate of hard strong steel rotating as a unit with the turret about the axis thereof, and located immediately above the turret sprocket driven by the chain. Thereby axially-directed forces are removed from the sprocket itself and it is required only to transmit torque or rotational force to the turret.

Another object is to provide an improved system of conducting blowing air under pressure to each head in succession, as the turret rotates, wherein each of a plurality of three-way valves is located contiguous to its respective blowing head, and embodies a cam follower connected with the operating plunger or lever of the valve. Each follower bears upon a fourth cam which is fixed to extend about the axis of rotation of the turret and which is so shaped, constructed and arranged as to, in succession, (a) close each valve to ambient air, (b) connect a common supply of air under pressure to the head, to effect blowing, and (c) to then re-connect its head to ambient air or exhaust.

Still another object is to provide each mold half, both fixed and pivotable, with its own individually-controllable conduit for conduction thereto from a common source, of coolant such as water, to and through the cooling jackets of the mold.

Another object is to provide a blowing apparatus or machine as aforesaid, wherein oil-pressure actuating means are eliminated and wherein all movement functions are effected by cams which are fixed and which extend coaxially about the axis of rotation of the turret, in coaction with cam followers each of which follows a respective one of the cams and in proper timed sequence effects a corresponding functional movement.

Other objects and advantages of the invention are present and will become obvious to those skilled in the art, after a study of the following detailed description, in connection with the accompanying drawing.

Figure 1:
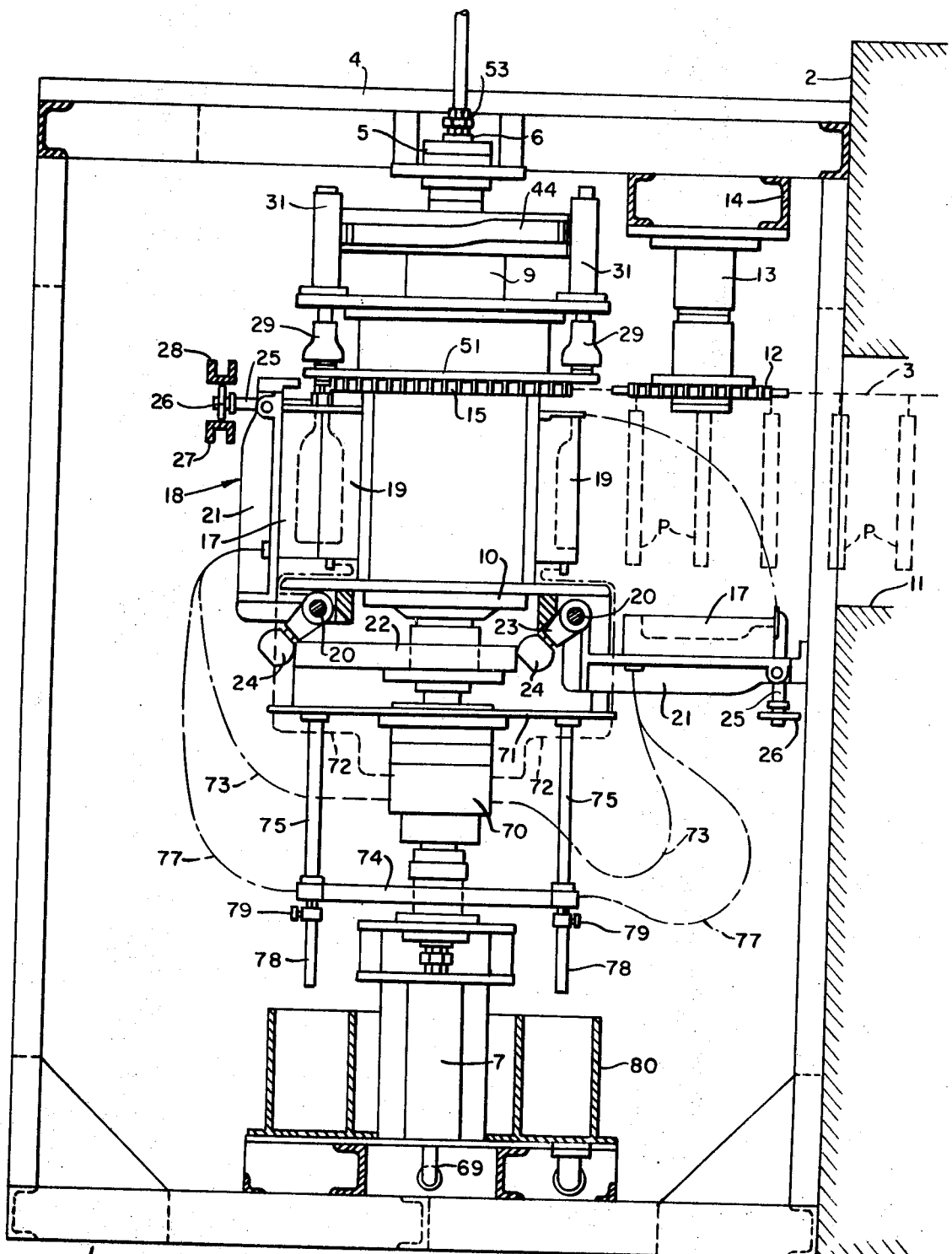
FIG. 1 is an elevational view of the blowing machine embodying the invention.

Referring in detail to the drawing, a metal frame generallly identified at 1, is located immediately adjacent a furnace 2 from which emerges a chain schematically indicated at 3, carrying in spaced relation therealong a continuous depending row of preforms P heated to molding temperature. The frame is an item built up from channel members welded or otherwise secured together at their meeting ends, into a rigid unitary structure.

At its top, horizontal parallel cross members one of which is identified at 4, FIG. 1, support an upper mounting 5 for a fixed vertical main shaft 6. See also FIG. 3. The shaft extends downwardly to the base of the frame where its lower end is supported by a second mounting 7 carried by suitable tie beams of the frame.

A turret generally identified at 8 is journaled upon shaft 6 by upper and lower anti-friction bearings 9 and 10, respectively. Upper bearing 9 appears in greater detail on FIG. 3. The turret is a built-up item and will be described subsequently in greater detail.

Referring more particularly to FIG. 1, chain 3 carrying heated preforms emerges from opening 11 in the end wall of furnace 2 and passes about an idler sprocket 12 journaled on a shaft 13 fixed in frame 1 by bracket 14. A sprocket 15 which, for example, may have twenty-four teeth is fixed by cap screws one of which is identified at 37, to turret 8 for rotation as a unit therewith. Chain 3 passes about sprocket 15 as is also schematically indicated upon FIG. 2, and thus rotates the sprocket and the entire turret in synchronism with the linear speed of the chain. As also clearly appears from FIG. 2, preforms P are thus moved sequentially and tangentially into desired relation with the turret. After passing in operative relation through a predetermined angle with respect to the turret, the chain extends about a second idler sprocket 16 from whence it departs to pick up further preforms.

Figure 2:
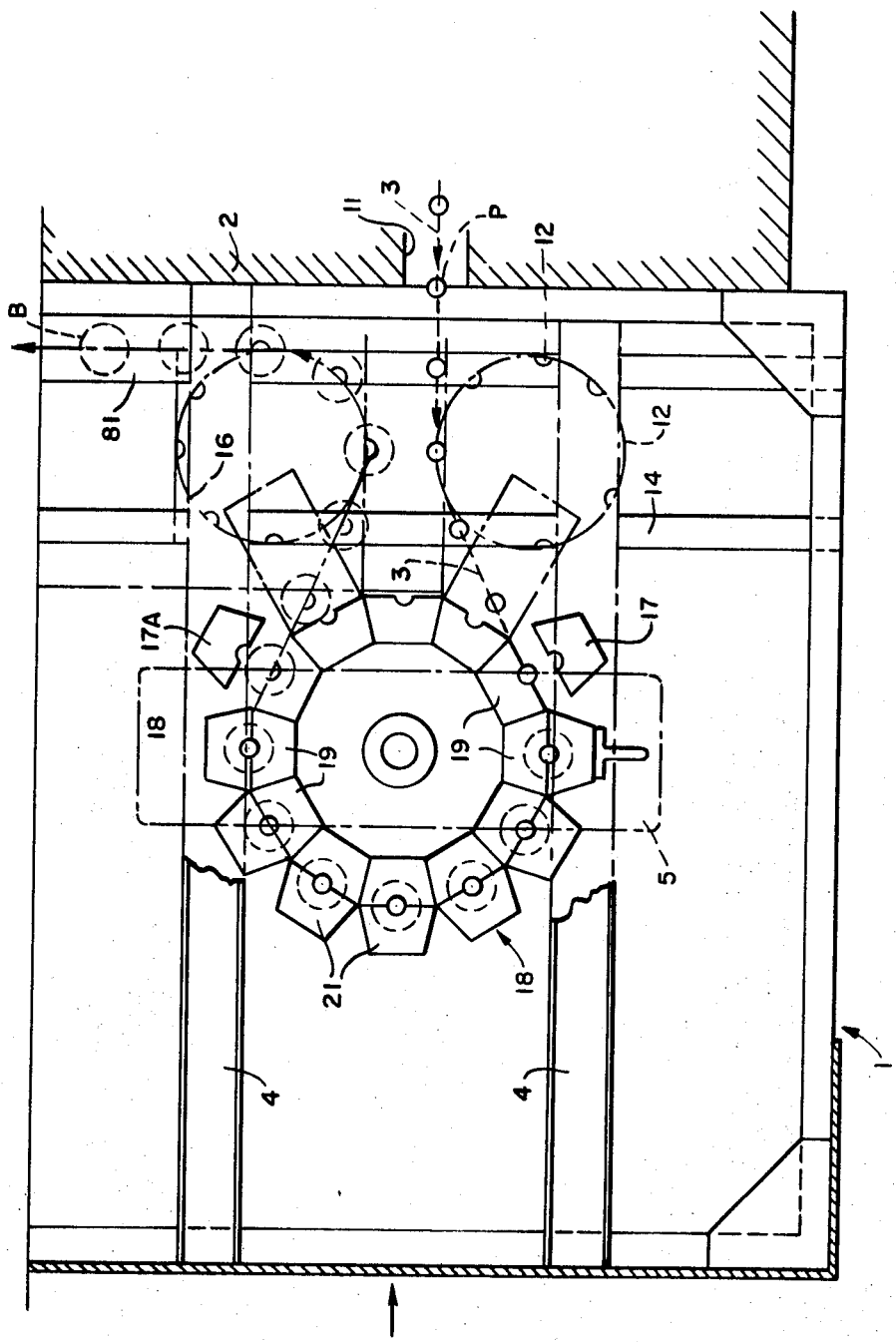
FIG. 2 is a schematic plan view of the machine of FIG. 1, showing the arrangement of molds about the central axis of the turret, certain of the molds being shown in opened position for introduction into, and removal from them, of a heated preform and a shaped article, respectively.

Idler sprocket 12 is so located that chain 3 is guided into contact with main sprocket 15 at a location where one pivotally mounted half 17 of a respective one of a number of two-part molds 18 carried by and rotatable as a unit with turret 8, is about to close upon its other and fixed half 19, as indicated at FIG. 2. When fully pivoted into closed relation upon and with respect to its corresponding fixed half, the mold then encloses one of the preforms carried by the chain. Just before the chain starts to separate from main sprocket 15 in its continued passage thereabout, the corresponding pivoted mold half, as indicated at 17A, FIG. 2 has begun to separate from its fixed half, thus freeing the blown article for removal from its mold as it separates with the chain, from the turret.

Continuing more detailed description of the identical molds of which there may be a total of twelve, as shown upon FIG. 2, the twelve fixed halves are mounted facing outwardly, in vertical uniformly-spaced angular relation on and about the axis of turret 8. Just below each fixed half there is journaled a respective one of twelve shafts two of which are identified at 20, FIG. 1. On each of these shafts is fixed an L-shaped lever 21. A mold half 17 is fixed to one arm of each lever. Thus on FIG. 1 at the right, one of levers 21 is shown in the full mold-open position while at the left another lever is shown with its mold half fully closed on the corresponding fixed half. Thus it will be noted that each movable mold half is pivotable about the horizontal axis of its shaft 20, 90° from a fully open to a fully closed position.

Pivoting of the movable mold halves in timed relation with rotation on and by turret 8, is effected by a cam 22, FIG. 1, fixed on shaft 6. Each shaft 20 has a short lever 23 fixed thereto and having a generally spherical cam follower 24 journaled on its distal end. The cam is shaped so as to move each pivoted mold half between its fully open and fully closed positions in proper timed sequence, about as described previously in connection with FIG. 2.

Each pivotable mold half is provided at its top end with a locking lever 25 pivoted intermediate its ends to the contiguous outer end of lever 21 and provided at one free end with a cam follower or roller 26. The other end of each lever is equipped with a latch which is operable to engage a cooperating part on the upper end of the corresponding fixed mold half and thereby lock the two together in closed blowing relation. Referring to FIG. 1, the particular lever 25 shown at the left has been pivoted clockwise to locking position, by a lower fixed cam track 27 which roller 26 engages at the proper instant, in response to rotation of the turret. In a like manner each lever 25 is, at the proper instant, sequentially pivoted to unlocking position after blowing of the preform has been completed, and in continued rotation of the turret, by a second and upper cam track 28. In general it is not necessary for cam tracks 27 and 28 to extend through 360° about the central axis of shaft 6. At the proper instant when a mold has been fully closed in rotation of the turret, its follower 26 engages cam track 27 and is moved thereby to lock the mold just prior to blowing of the preform. Then after molding and cooling has been effected in continued rotation of the turret, follower 26 engages cam track 28 and is thereby pivoted to unlocking position. To avoid unnecessary complication of the drawing, the brackets or mounting means by which cam tracks 27 and 28 are fixed, have been omitted.

As fully explained in the patent identified, certain regularly-spaced pivots between contiguous links of chain 3 are tubular, and are constructed and arranged so that the lower end of each pivot is held inserted into the upper open end of a preform until blowing thereof has been completed. Just before blowing of each preform is to be initiated, a respective one of a plurality of blowing heads 40 of which there are twelve in the machine shown, is lowered into pressure-tight contact with the upper end of the corresponding chain-link pivot. Following this, air under pressure is admitted to the head and the plastic preform is expanded into the shape of its enclosing mold cavity.

Figure 3:
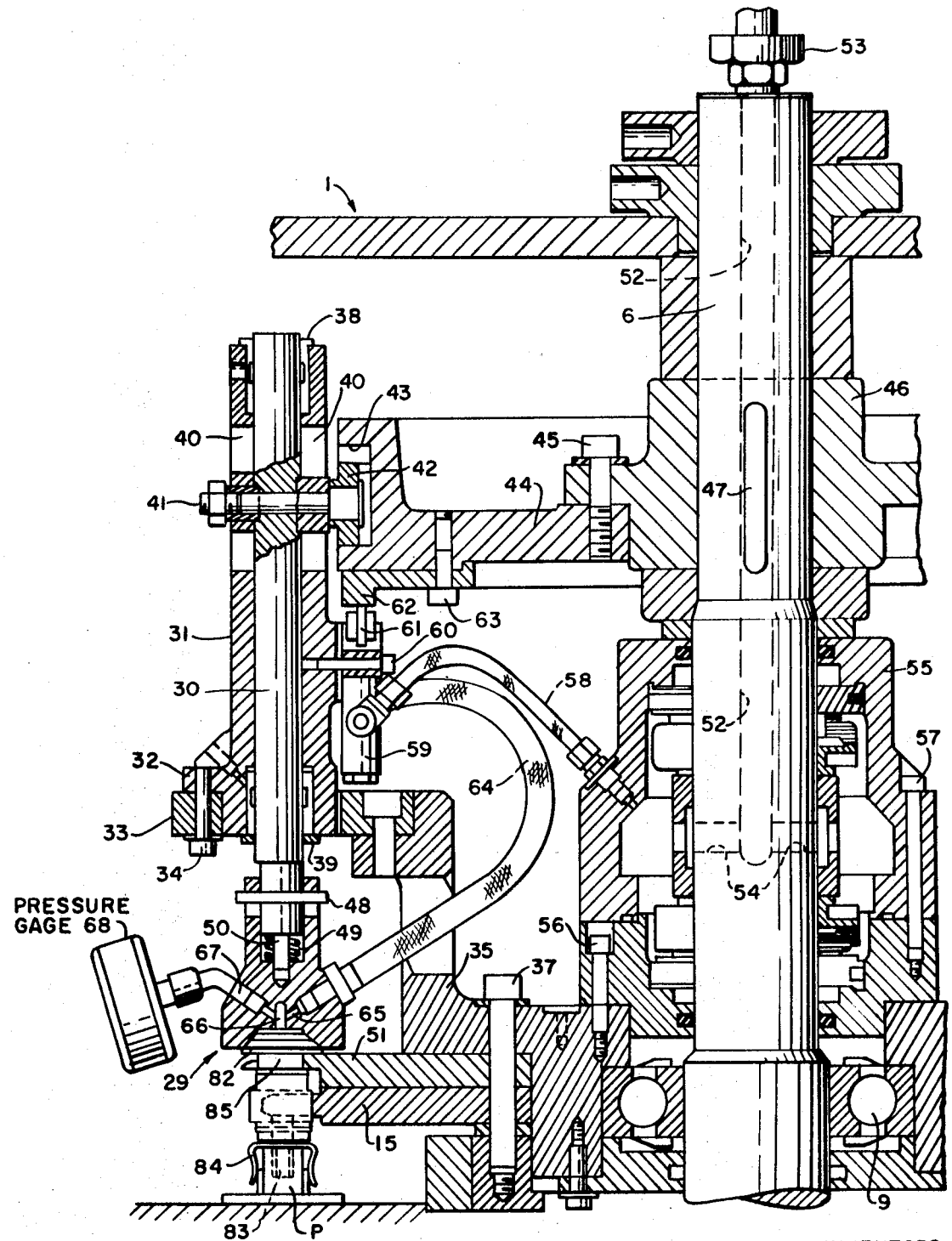
FIG. 3 is a detail view to an enlarged scale of one blowing head and actuating and control means therefor.

Referring to FIG. 3 wherein is shown one of the twelve identical blowing heads 29, each head is carried at the lower end of a respective one of twelve shafts one of which is identified at 30. Each shaft is mounted for vertical translation only in a sleeve 31 which is flanged at its lower end as at 32. The lower end of the sleeve protrudes below the flange and has a smooth accurate fit in an aperture of a ring or plate 33. One or more cap screws 34 rigidly unite flange 32 to ring 33.

Shaft 30 is guided for vertical translation in and with respect to sleeve 31, by bearings 38, 39 fixed in the top and bottom ends respectively, of the sleeve. The sleeve has longitudinal diametrically-opposite slots 40 in and through its upper portion. A pin 41 is fixed within a diametral hole through shaft 30 and is equipped with bearing pads fitting slots 40 which thus act to positively guide the shaft for vertical translation only.

The inner end of pin 41 projects radially and is formed as a bearing for a roller or cam follower 42 which, as the turret rotates, travels in a cam slot or track 43 of cam 44 fixed by machine screws one of which is shown at 45, to the flange of a hub 46 keyed to main shaft 6 at 47. Cam slot 43 is so shaped that as turret 8 is rotated by chain 3, each shaft 30 is reciprocated in proper timed sequence, first downwardly to press its blowing head 29 into contact with a corresponding tubular link pivot of the chain and then, after blowing is completed, to retracted position wherein its head 29 is free and clear of the pivot. As clearly shown upon FIG. 3, each head 29 has an integral upwardly-extending sleeve portion fitting the reduced lower end of its shaft. A pin 48 is fixed in a diametral hole in the reduced end of the shaft and its protruding ends extend into slots in the sleeve to thus provide for limited reciprocation of each head on and with respect to its shaft. A coil spring 49 surrounds a guide pin 50 integral with and extending centrally from the lower end of shaft 30 and, in a way clear from the figure, urges the head into lowermost position limited by contact of pin 49 with the upper ends of the slots in the sleeve of head 29.

Each blowing head 29 has a frusto-conical recess or cavity in its lower face which is shaped, constructed and arranged as to make a pressure-tight fit over and about the upper end of one of the tubular chain-link pivots, when moved downwardly by its shaft 30. Still referring to FIG. 3, a toothed wheel 51 is interposed between the hub of mounting member 35 and sprocket 15, and is fixed therewith by the same machine screws 37 that unite the parts of the turret assembly previously described. The teeth of wheel 51 are in registration with those of sprocket 15 and are equal in number to those of 15, but are of lesser circumferential extent and are longer in the radial direction and so shaped and spaced that the space between each contiguous pair receives with a smooth fit the cylindrical neck portion 85 of a link pivot. This neck portion is surmounted by a frusto-conical enlargement 82 shaped to fit within and to make pressure-tight engagement with the walls of the cavity in head 29. Also noted with respect to the link pivot, are a depending reduced tubular end 83 fitting within the upper open end of preform P, and a clip 84 fixed with the pivot and frictionally engaging the preform, exteriorly thereof. Wheel 51 is made of high-strength steel and because of its construction and position, it absorbs downward thrust of the corresponding head 29 as the latter is moved down by action of cam slot 43 into pressure-tight engagement with the upper end of one of the tubular pivots of chain 3, and the added force exerted when blowing air under pressure is admitted to the head.

Thus the specially constructed chain-link pivots or chucks perform the dual function of effecting pressure tight union between the blowing head and preform, and of absorbing the downward force exerted by and through the blowing head. Because wheel 51 acts, as just described, to absorb the exerted forces, the links of the chain exert little or no friction on sprocket 15 and therefore the chain has the sole function of rotating the turret assembly. The construction just described with regard to wheel 51 may also be advantageously used in connection with other sprockets about which the chain passes, in particular those located within furnace 2. In general it is not required that each chain-link pivot be of the special tubular form described. For example in the model shown, sprocket 15 may have twenty-four teeth so that every other chain-link pivot will, in this case, be tubular as shown and described, while intermediate link pivots may be of conventional form and construction. Of course it is also possible that all pivots may be of the special tubular form.

At its upper end shaft 6 has a central axial bore 52 communicating with pipe fitting 53 for connection with a source of compressed air, not shown. At its lower end, referring to FIG. 3, the bore terminates in radial passageways 54 which open into a chamber defined by a glandular sleeve 55 fixed by screws 56, 57 to rotate as a unit with turret 8. Leakage of air from the sleeve, along the shaft, is prevented by conventional glands above and below the chamber.

A pipe 58 is connected at one end in communication with the chamber defined by sleeve 55, and at its other end with a three-way valve 59 fixed by screws one of which appears at 60, to sleeve 31. The valve has an actuating plunger or lever provided at its end with a cam follower or roller 61. The plunger is spring-urged upwardly so that roller 61 is continuously in contact with the downwardly-facing surface of a cam ring 62 affixed by machine screws 63 to the under surface of cam ring 44. A second pipe 64 connects the interior of the valve with the corresponding blowing head 29. It will be understood that there is one valve such as 59, and its connections 58, 64, for each blowing head.

The actuating plunger or lever of each valve 59 is spring-urged to a normal position wherein pipe 58 is cut off and its blowing head is connected with ambient air. When during rotation of turret 8, a hot preform has been loaded into the open fixed half 19 of a mold, and the movable half 17 has, by cam 22, been pivoted upwardly into fully closed relation and clamped in such position by operation of fixed cam track 27, and blowing head 29 has, by cam 44 been forced downwardly into pressure-tight contact with the upper end of the tubular chain-link pivot, cam 62 acts to positively move the plunger of the corresponding valve 59. During the first portion of movement of the plunger or lever, pipe 64 is cut off from ambient atmosphere and then pipes 58 and 64 are interconnected to admit full blowing pressure to the interior of the preform within the mold. Thereby the preform is expanded and conformed to the shape of the mold cavity.

From FIG. 3 it is noted that pipe 64 is connected with a radial passage 65 in head 29 and that this passage communicates with a central axial passage or bore 66 in the head. A third passage 67 extends to a gage 68 by which the operator may determine at any instant, the pressure effective within the head.

To provide for circulation of cooling water in and through the jackets of the mold sections 17, 19, the lower portion of main shaft 6 has a central axial bore in communication at its lower end with a fitting 69 for connection with a source of coolant, not shown. At its upper end the bore terminates in radial holes which extend into the internal circumferential channel formed in a glandular sleeve 70 which is centrally disposed about the shaft and fixed with the turret for rotation as a unit therewith, by suitable connection generally indicated at 71. Sleeve 70 has radial bores in communication with the interior of the sleeve and at their outer ends connected with fittings, not shown, by which coolant may be conducted to respective flexible hoses schematically indicated at 72 each leading to a respective one of the cooling jackets of the fixed mold halves 19, and 73 leading to the jackets of the pivoted mold halves. It will be understood that there is one such hose 72 for each fixed mold half, and one 73 for each pivoted mold half. Also sleeve 70 has internal packing or glands above and below the circumferential channel therein, which effectively prevent leakage of coolant along the shaft.

An outlet manifold 74 is fixed to the turret assembly for rotation as a unit therewith, by a number of tubular rods 75 which at their lower ends are attached to and support the manifold, and at their upper ends are secured to a functionally integral part of the turret. Flexible hoses as indicated at 77 are in communication at one end, each with a respective one of the fixed and pivoted mold halves, for the exhaust of coolant therefrom, into manifold 74. Exhaust pipes 78 each equipped with a control valve 79, depend from manifold 74 and direct the exhausted coolant downwardly into an annular receptacle 80 from which it may be drained or recirculated. It is contemplated that there will be one valve for each fixed mold half and one for each pivoted mold half, so that precise control of coolant to each mold may be individually effected.

The outlet connections for coolant in sleeve 70, one for each mold, are uniformly spaced about the aixs of shaft 6. The radially extending opening from the upper end of the axial bore extending from the lower end of the shaft, has a definite angular extent of, say, 30° measured in a plane normal to the shaft. The opening is angularly related with the aforesaid outlet connections so that coolant will begin to flow to the jacket of each mold, in succession, as the corresponding coolant connection rotates into communication with the opening. Flow of coolant then continues through each respective jacket during the ensuing 30° of rotation of the turret and is then cut off. This cooling function takes place in each mold jacket pair, in succession. In general the parts are so related that flow of coolant begins as soon as blowing is completed and may extend up to the time the mold begins to open. The particular angle of rotation of the turret during which coolant flows in each individual mold will vary in accordance with numerous factors including rate of flow of coolant, its temperature on entry, material and size of articles produced, and rate of rotation of turret.

In operation, with chain 3 being driven at uniform linear speed and emerging from furnace 2 with hot preforms supported by and depending from the successive tubular link pivots, each preform is guided about sprocket 12 and thence moves into a respective one of the rotating and presently-open fixed mold halves 19. On continued rotation, fixed cam 22 acting on the corresponding lever 23, pivots lever 21 and moves the mold half 17 into closed position over a preform. Then roller 26 is pivoted upwardly by cam 27 to lock the two mold halves together.

Next, on continued rotation of the turret 8, blowing head 29 is forced downwardly by coaction between cam track 43, follower 42 and shaft 30, into pressure-tight connection or engagement with the upper end of the corresponding tubular chain-link pivot. Immediately thereafter, cam 62 acts upon the plunger of valve 59 to first obturate pipe 64 from ambient air and then to connect pipes 58 and 64 so that air under pressure acts to expand the hot plastic preform into conformity with the mold cavity. The shaped article is then cooled by liquid circulating in and through the jackets of the mold halves, as previously described.

As the closed mold, in continued rotation of the turret, approaches sprocket 16, cam 28 acts upon follower or roller 26 to unlock the mold. On continued rotation of the turret, a riser portion of cam track 43 elevates head 29 out of contact with the tubular chain-link pivot, cam 22 permits lever 21 to pivot downwardly to thus move mold half 17 to its open position shown at the right of FIG. 1. The shaped article, still suspended from the chain pivot, is then extracted from the fixed mold half as the chain separates from the turret in travel to and about sprocket 16. By means adequately shown and described in connection with FIG. 5 of the aforesaid patent, each shaped article is then stripped from its chain-link pivot and deposited upon a conveyor indicated schematically at 81, FIG. 2.

The operation is rapid and continuous. Chain 3 moves at constant linear velocity, without dwell, and turret 8 at continous synchronous rate of rotation. For each 360° rotation of the turret, twelve articles are shaped and delivered to the conveyor, in the model shown. Because of the fact that there are no dwell periods, there are no acceleration forces on the apparatus which may be therefore made relatively light in weight. Power requirements are low, wear is a minimum, and the rate of production very high.

It will be understood that the foregoing disclosure is by way of illustration only and is not to be taken in a limiting sense because many modifications, alterations, rearrangements and substitutions of equivalents will readily occur to those skilled in the art, after a study of the aforesaid patent and the present application.

Having fully disclosed the invention, what we claim and desire to secure by Letters Patent is:

1. In apparatus for the blowing of tubular preforms into shaped articles, a shaft fixed with its axis vertical, a first cam fixed with said shaft coaxially of said axis, a turret journaled on said shaft for rotation about said axis, a plurality of first mold halves fixed on said turret in equiangularly spacer relation about said axis, a plurality of second mold halves each pivoted on said turret in cooperative relation with a respective one of said first mold halves, and movable from a first position clear of its fixed mold half, to a second position closed on and cooperating with its fixed mold half, to complete a mold cavity, means including a plurality of first followers rotating in synchronism with said turret and bearing on said first cam, to operate each said follower in succession, by and in response to rotation of said turret, to thereby directly and positively move each said second mold half from first to second position at a first location in rotation of said turret, and at a second and sequential location to effect return of each said second mold half to first position, and feed means operable to deposit a preform into each open first mold half, at a third location in advance of said first location.

2. The apparatus of claim 1, said feed means comprising a sprocket fixed with said turret for rotation coaxially of and about said axis, a chain comprising tubular link-pivots each adapted to engage and support a respective preform, and means guiding said chain into engagement with and about said sprocket, to guide each preform into a respective fixed mold half at said third location.

3. The apparatus of claim 2, each movable mold half forming a pair with its corresponding fixed mold half, a plurality of blowing heads carried by and rotating as a unit with said turret, guide means mounting each said head for reciprocation on said turret, parallel with said axis, from a first position clear of its respective mold pair to a second position in blowing relation therewith, a second cam fixed with said shaft about said axis, and a plurality of second cam followers carried by said turret, each connected with a respective one of said heads and actuated in sequence by said second cam in response to rotation of said turret, to reciprocate its head between its said first and second positions.

4. The apparatus of claim 3, each said head being moved by its cam follower into contact with a respective tubular chain-link pivot, subsequent to movement of the corresponding second mold half to its said second position.

5. The apparatus of claim 3, each tubular chain-link pivot including a frusto-conical enlargement formed on one protruding end thereof, each said head including a frusto-conical recess constructed and arranged when moved to a second position, to make pressure-tight contact with a respective one of said enlargements.

6. The apparatus of claim 3, a plurality of valves each carried by said turret adjacent a respective one of said heads, a third cam fixed with said shaft coaxially about said axis, a plurality of third cam followers carried by said turret, each bearing on said third cam, a pressure connection from each said valve to a respective one of said blowing heads, and a pressure connection from a source of pressure fluid to each said valve, each said valve being operated by said third cam, in sequence, to connect said source with its said blowing head when the latter is in its said second position.

7. The apparatus of claim 6, each said valve being three-way and normally connecting its corresponding blowing head to atmosphere, said third cam actuating each valve in sequence to first obturate its head from atmosphere, secondly to connect the head and source, and thirdly to return the head to exhaust to atmosphere.

8. The apparatus of claim 5, a toothed wheel fixed for rotation with said turret, coaxially of said axis and immediately above said sprocket, said wheel having spaced radially-projecting teeth constructed and arranged so that contiguous pairs of said teeth engage about a respective one of said tubular chain-link pivots in rotation with said turret, immediately beneath its enlargement, to absorb thrust exerted thereon by its said blowing head when moved to second position.

9. The apparatus of claim 3, each said guide means comprising a vertical guideway fixed with said turret, a shaft mounted in said guideway for guided vertical translation only, each said second cam follower being connected to a respective one of said shafts, each said blowing head being mounted for limited reciprocation on the lower end of its shaft, and means yieldingly urging each head into a lowermost limiting position on and with respect to its shaft.

10. The apparatus of claim 1, each said mold half including a cooling jacket, there being an axial bore in and opening through one end of said shaft, a coolant distribution sleeve fixed with said turret in surrounding relation with said shaft, said bore communicating at one end with the hollow interior of said sleeve, a plurality of pipes each connected at one end with said hollow sleeve and at its other end with a respective one of said mold half cooling jackets, a plurality of exhaust pipes each leading from and connected with a respective one of said mold half jackets, a plurality of control valves each in a respective one of said exhaust pipes, and means at the other end of said bore for connection with a source of coolant under pressure.

11. In apparatus for the blowing of tubular preforms into shaped articles, a turret rotatable on and about a fixed vertical axis, and including a toothed sprocket and a toothed wheel superposed over said sprocket, said sprocket and wheel rotating as a unit with said turret, coaxially of said axis a link chain including tubular pivots interconnecting at least some of the links of said chain, each said tubular pivot being received in the space between two consecutive teeth of said sprocket and wheel, and including an upwardly directed enlarged head of greater diameter than the space between teeth of said wheel, for direct support on and by said wheel, a blowing device, means mounting said device on said turret for vertical reciprocation from a first position spaced from said head, to a second position making pressure-tight contact with said head, and means responsive to rotation of said turret and connected with said device to reciprocate the same between said first and second positions in timed relation with rotation of said turret, said wheel absorbing the downward thrust exerted by said device upon said head, when said device is in said second position, in continuous rotation of said turret.

References Cited
UNITED STATES PATENTS

| | | | |
|---|---|---|---|
| 2,901,769 | 9/1959 | Sherman et al. | |
| 3,079,637 | 3/1963 | Marzillier | 18—20 B X |
| 3,415,915 | 12/1968 | Lecluyse et al. | 264—94 |

H. A. KILBY, JR., Primary Examiner

U.S. Cl. X.R.

18—5 BP, 20 B